(No Model.)
W. H. KNAPP.
PADDLE WHEEL FOR BOATS.
No. 526,533.        Patented Sept. 25, 1894.
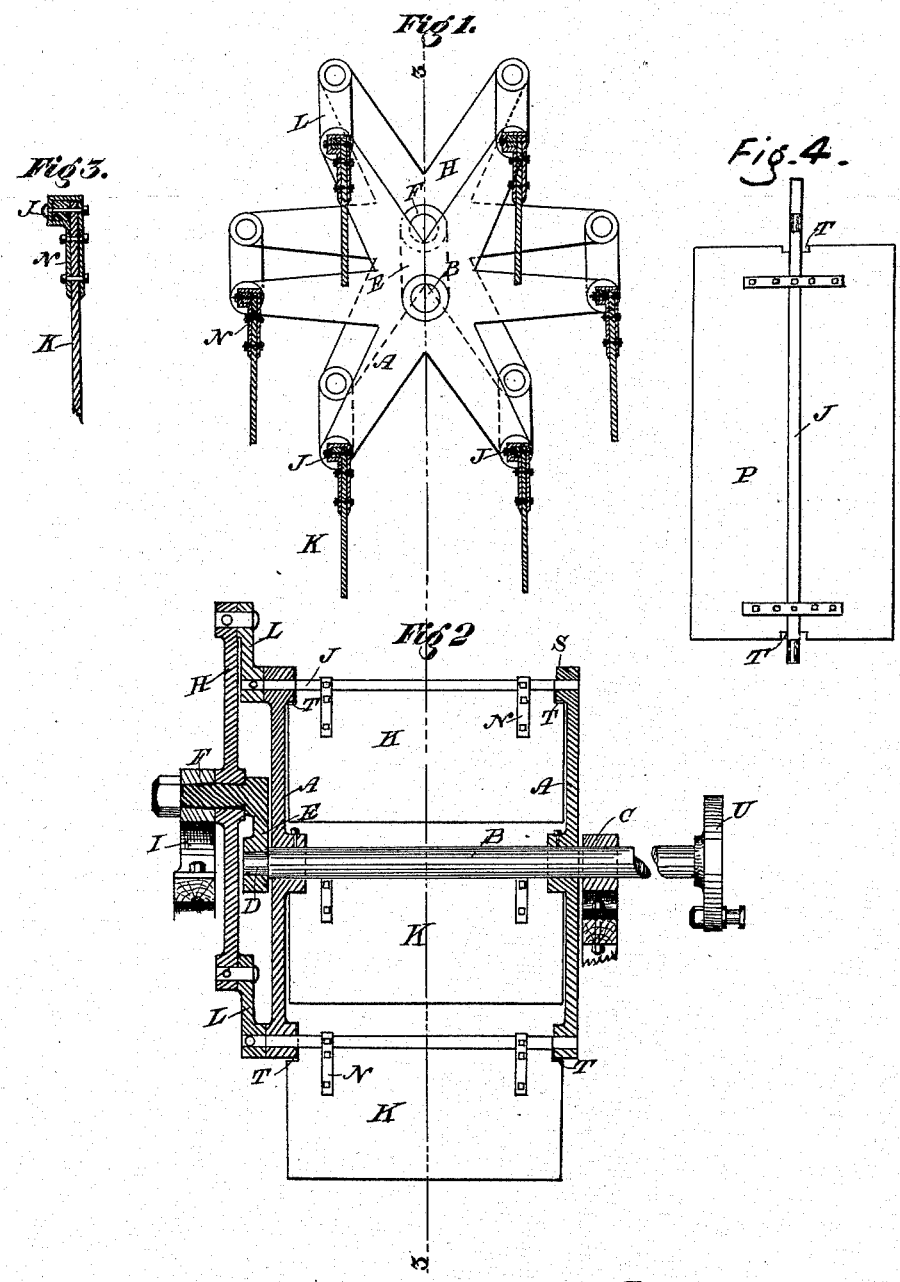
Witnesses.
Henry J. C. Martin
Levi F. Cox
Inventor.
William H. Knapp
By Lucius C. West
Attorney.

UNITED STATES PATENT OFFICE.

WILLIAM H. KNAPP, OF GALESBURG, MICHIGAN.

PADDLE-WHEEL FOR BOATS.

SPECIFICATION forming part of Letters Patent No. 526,533, dated September 25, 1894.

Application filed June 6, 1894. Serial No. 513,663. (No model.)

*To all whom it may concern:*

Be it known that I, WILLIAM H. KNAPP, a citizen of the United States, residing at Galesburg, county of Kalamazoo, State of Michigan, have invented a new and useful Paddle-Wheel for Boats, of which the following is a specification.

This invention relates to that class of paddle-wheels in which the axles of the paddles have pivoted bearings in the periphery of the paddle-wheel proper, and are held in a uniform position in relation to each other by cranks connecting their axles with the periphery of the paddle-controlling-wheel, which paddle-controlling wheel is eccentric to the paddle-wheel proper, that is, the axis of the paddle-wheel and the paddle-controlling wheel are on different planes parallel with each other. Similar wheels have heretofore been constructed having many variations from each other. In one instance the axle of the paddle-wheel proper passes through the center of the paddle-controlling-wheel, said paddle-controlling wheel having side roller-bearings to hold it in position in lieu of the central axis. In another the paddle-wheel axles had no bearing support at the inner end but depended for support upon the cranks which connected the paddle-wheel with the paddle-controlling wheel; and in still another the paddle-wheel axle did not pass through the paddle-controlling-wheel but did have axle-bearings at the inner end but in this latter-wheel the spokes were bent inward to a hub at the center of the wheel and in all these prior constructions the paddles extended on both sides of their axles.

The object of my invention is to effect greater solidity, compactness and simplicity, by employing a bearing-support for the inner end of the paddle-wheel axle, in which construction the spokes of both of the wheels of the paddle-wheel proper, are straight and said wheels are rigidly attached to their axle in close proximity to its end-bearings; and in which the spokes of the paddle-controlling-wheels are also straight so that its bearings shall be in close proximity to the inner end of its axle on a direct line with its spokes; and long paddles in proportion to the distance the two wheels of the paddle-wheel proper, are apart, thus making a more simple, rigid and compact wheel than heretofore; and another object is to employ paddles which are only on one side of their axle and an improved method of attaching them to said axle.

In the drawings forming a part of this specification Figure 1, is a sectional elevation on line 3—3, looking from a point at the right hand of Fig. 2. Fig. 2, is a sectional elevation on line 3—3, in Fig. 1, (said lines crossing both figures) looking from a point at the left; Fig. 3, a detail enlarged from Fig. 1, and Fig. 4, is a plan view of one of the paddles showing a change in structure.

Referring to the lettered parts of the drawings, A A are the two wheels of the paddle-wheel proper, rigidly attached to the axle B, in close proximity to its end bearings as will be seen in Fig. 2. The outer end of the axle B, has bearings at C, in a portion of the frame which supports the wheel, and the inner end of said axle B, has bearings at D, in the lower end of the right angle projection E, which projection is integral with the axle F, of the paddle-controlling wheel H. The inner wheel A, is in such close proximity to said integral projection as to just clear the same when revolving. The axle F, is rigidly attached to another portion I, of the frame which supports the wheel, said axle F, being on a different but parallel plane with the plane of axle B, thus bringing the paddle-wheel proper and the paddle-controlling-wheel eccentric to each other. It will be observed that the spokes of these wheels are straight and that the point of axle-support is on a line with said spokes and that the wheels are just sufficiently far enough apart to clear the right angle integral projection E, of the axle F, and also that the paddle-controlling-wheel H, is in such close proximity to the integral projection E, as to just clear the same when revolving.

The ends of the axles J, of the paddles K, project through the ends of the spokes of the inner wheel A, and to said projecting ends cranks L, are rigidly attached, the upper ends of said cranks L, being pivotally attached to the ends of the spokes of the paddle-controlling-wheel H, in the ordinary manner.

In Figs. 1, and 2, it will be observed that the paddles K, extend from their axles J, on one side only. This makes the paddles cheaper and lighter than they would be if they projected on opposite sides of their axle, and since only the lower portions of the paddles enter the water, the upper portions of the paddles are not needed. Besides if employed they would come in contact with the flying water and spray, causing undue friction without any material advantage.

The axles J, and the paddles K, are angular in cross-section, Fig. 3, the upper end of the paddle fitting against one side of said axles, and a metal strap N, bent upon itself and shaped to fit the outer surface of the axles and paddles, is bolted thereto, thus making a rigid attachment.

Of course if preferred the paddles may extend on opposite side of axles J, as at P, in Fig. 4.

In order to have the spokes of the wheel A, as light as possible and still have a sufficient bearing surface for the paddle-axles J, at the ends, said spokes are provided with an inwardly projecting boss S at said ends, and in order to have the wheels A A, as near together as possible and still have the paddles K, as long as possible in proportion thereto, said paddles are provided with notches T, at the corners to accommodate said bosses.

At U, Fig. 2, is shown a crank-disk attached to the end of paddle-wheel-axle B, to indicate where a power is applied.

Having thus described my invention, what I claim as new, and desire to secure by Letters Patent of the United States, is—

A paddle-wheel, comprising the two axles on different planes eccentric to each other, one of said axles having a right-angle integral projection forming a bearing-support to the inner end of the other axle, two wheels rigidly attached to the latter named axle, one in close proximity to each end-bearing of said axle, the spokes of said wheels being straight, and those of the inner one of said wheels being in such close proximity to the right-angle projection as to just clear the same when the wheel revolves, paddles pivoted in the outer end of the paddle-wheel-spokes by axles, said spokes being provided with an inner boss, and the paddles having notches to receive said bosses, a paddle-controlling-wheel having straight spokes and revoluble on its axle in such close proximity to the integral projection as to just clear the same when revolving, and cranks connecting the axles of the paddles with the outer end of the spokes of said wheels, substantially as set forth.

In testimony to the foregoing I have hereunto subscribed my name in the presence of two witnesses.

WILLIAM H. KNAPP.

Witnesses:
LEVI F. COX,
S. G. ENSMORE.